United States Patent [19]
Dupuy

[11] Patent Number: 6,065,079
[45] Date of Patent: May 16, 2000

[54] APPARATUS FOR SWITCHING A BUS POWER LINE TO A PERIPHERAL DEVICE TO GROUND IN RESPONSE TO A SIGNAL INDICATING SINGLE ENDED CONFIGURATION OF THE BUS

[75] Inventor: James M. Dupuy, Houston, Tex.

[73] Assignee: Compaq Computer Corporation, Houston, Tex.

[21] Appl. No.: 09/022,186

[22] Filed: Feb. 11, 1998

[51] Int. Cl.[7] .................................................. G06F 13/00
[52] U.S. Cl. .......................................... 710/101; 710/129
[58] Field of Search .............................. 710/62, 63, 101, 710/100, 102, 129; 395/500; 326/30

[56] References Cited

U.S. PATENT DOCUMENTS

| | | | |
|---|---|---|---|
| 5,553,250 | 9/1996 | Miyagawa et al. | 710/129 |
| 5,570,037 | 10/1996 | Llorens | 326/30 |
| 5,603,039 | 2/1997 | Strevey | 713/330 |
| 5,608,883 | 3/1997 | Kando et al. | 395/309 |
| 5,864,715 | 1/1999 | Zani et al. | 710/63 |

*Primary Examiner*—Xuan M. Thai
*Attorney, Agent, or Firm*—Sharp, Comfort & Merrett, P.C.

[57] ABSTRACT

An apparatus reduces inductive coupling and cross-talks in a bus which is connected to a combination of differential devices and single-ended devices. Each differential device has a positive line and a negative line. The positive line is provided to an input of another device on a bus as normal. The negative line of the differential device is routed by a switch in accordance with the invention. The switch receives from the bus a sensing signal which is asserted when at least one single-ended device is connected to the bus. When the sensing signal is asserted, the switch grounds the negative line of the differential device. Alternatively, if all devices on the bus are differential devices, the switch connects the negative lines of the differential devices together and acts as a pass-through for the negative signal.

11 Claims, 3 Drawing Sheets

APPARATUS FOR SWITCHING A BUS POWER LINE TO A PERIPHERAL DEVICE TO GROUND IN RESPONSE TO A SIGNAL INDICATING SINGLE ENDED CONFIGURATION OF THE BUS

BACKGROUND OF THE INVENTION

The invention relates to data transmissions on a bus. More particularly, the invention relates to enhancing the quality of data transmissions between differential devices and single-ended devices on a bus.

One common computer bus is called a Small Computer System Interface ("SCSI") bus. The SCSI bus can be used for coupling physically small computers with peripheral devices, including disk drives, tape drives, printers, compact disk read-only memories ("CD-ROMs"), and scanners, among others. SCSI compliant devices conform to standards maintained by the American National Standards Institute, New York, N.Y., U.S.A., designated ANSI X3T9.2/86-109, Rev. 10H and X3T9/89-042. According to the standards, a plurality of SCSI devices may be daisy-chained to one SCSI port. Moreover, through a SCSI controller, these devices may function without host supervision.

SCSI buses may exist in a "differential" configuration or a "single-ended" configuration. A single-ended configuration uses a single conductor in a cable of up to six meters in length for each signal line. A voltage level on the conductor determines an assertion or a deassertion of a signal line. Each single-ended SCSI connection has, for each signal line, a driver device with a single output terminal connected to that conductor, and a receiver device with a single input terminal connected to that conductor.

A differential configuration uses a pair of conductors in a cable of up to 25 meters in length for each of the SCSI signal lines. Each pair of conductors is connected to a positive line and a negative line of the bus. A voltage difference between those conductors (referenced to ground) determines the assertion or the deassertion of that line. Each differential SCSI bus connection has, for each signal line, a driver device with a pair of output terminals connected to the pair of conductors, and a receiver device with a pair of input terminals connected to the pair of conductors. Additionally, a ground terminal typically exists to provide a local ground plane, or a ground path, for the circuit.

Due to the large installed base of peripherals with single-ended SCSI interface, it is desirable to support single-ended devices as well as differential devices in a computer system. In such a system, the positive line of one differential driver device is connected to the input of a single-ended receiver device, while the negative line of the differential driver device is typically connected to a local ground plane. Although such an interconnection of single-ended devices to differential devices may be satisfactorily made with short cables, such interconnection may cause unexpected problems. These problems become particularly evident when a long cable is used to connect the devices together. The problems may include glitches in data/command lines of the SCSI bus.

The glitches are caused in part by a phenomenon known as cross-talk. Cross-talk relates to a mutual inductive coupling between electrical signals carried by the SCSI bus lines where transitions on one line causes false transitions on adjacent lines. This effect occurs when the voltage level of one electrical signal which is physically near another electrical signal switches. In such a case, a return current for the switching signal takes a least inductive path and if other nearby electrical signals share this path, a mutual inductive coupling effect may occur and may result in unreliable data transmissions, thus limiting data transmission speed and integrity.

SUMMARY

An apparatus reduces inductive coupling and cross-talks in a bus which is connected to a combination of differential devices and single-ended devices. Each differential device has a positive line and a negative line. The positive line is provided to an input of another device on a bus as normal. The negative line of the differential device is routed by a switch in accordance with the invention. The switch receives from the bus a sensing signal which is asserted when at least one single-ended device is connected to the bus. When the sensing signal is asserted, the switch grounds the negative line of the differential device. Alternatively, if all devices on the bus are differential devices, the switch connects the negative lines of the differential devices together and acts as a pass-through for the negative signal. In this manner, the invention reduces inductive coupling by providing a least inductive return current path which is shared by the fewest number of signal lines in the bus.

In one aspect, the bus is a SCSI bus and the sensing signal is a SCSI DIFFSENS signal.

In another aspect, the switch is a solid state switch such as a transistor.

Advantages of the invention include the following. The invention provides a low inductive return path in place of the negative lines of the differential devices. Such low inductive return path allows a high quality, high integrity signal to be transmitted on the SCSI bus. Cross-talks on a differential SCSI bus loaded with single-ended SCSI devices among SCSI control and data lines are reduced. The reduction in cross-talk improves edge rates for signals being transmitted over the SCSI bus line, as measured by a rise time and a fall time of each signal. Moreover, the enhanced data integrity results in less errors which require retransmissions. Such reduction in retransmissions also enhances the overall data transfer throughput.

Other features and advantages will become apparent from the following description and from the claims.

DESCRIPTION OF THE PREFERRED EMBODIMENTS

Figure 1:
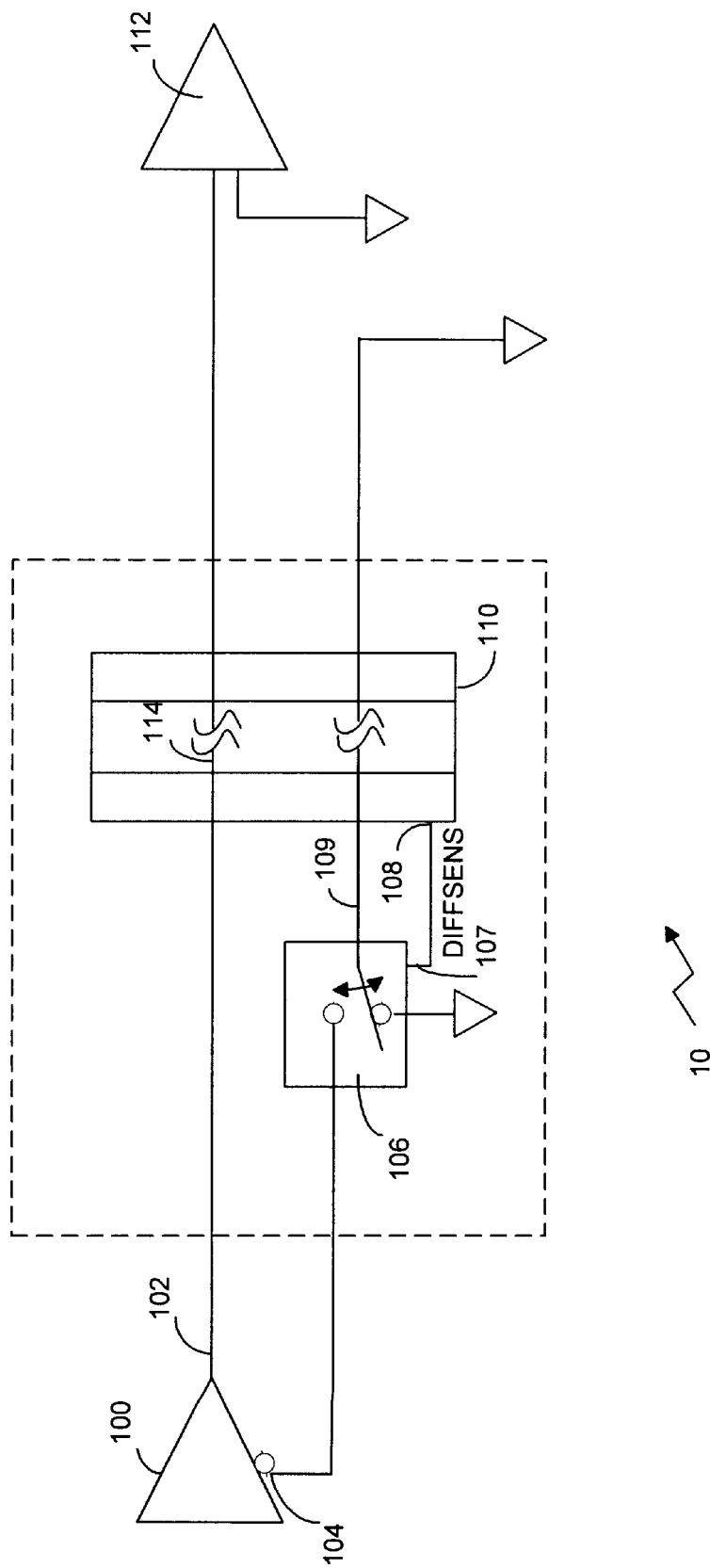
FIG. 1 is a schematic diagram of a circuit for enhancing signal transmissions.

FIG. 1 is a schematic diagram of an apparatus for reducing cross-talk and for enhancing signal transmissions when a differential device is used together with a single-ended device on a bus. In FIG. 1, a differential device 100, in this case a driver device, has a positive output 102 and a negative output 104. When driving a remote differential device, the positive output 102 is provided to the positive input of the remote differential device, while the negative output 104 is provided to the negative input of the remote differential device, as conventional. When driving a single-ended device 112, in this case a single-ended receiver device, the positive output 102 is connected to the input of the single-ended device 112 via a bus 110.

As the differential SCSI device 100 is driving the single-ended device 112, the negative output 104 is not used. The negative output 104 would otherwise be tied to ground at the differential driver 100 by a controller such as a SCSI controller. However, the SCSI controller can be located far from the connector. The longer the distance from the connector to the SCSI controller, the higher the inductance of the negative line when it is used as a ground for single-ended SCSI devices.

Although such connection between single-ended and differential devices may be acceptable for a short bu, over a long distance, such connection may cause inductive couplings and cross-talks to occur. The present invention reduces inductive coupling by providing a least inductive return current path through a switch 106.

In FIG. 1, the negative output 104 of the differential driver 100 is connected to a first input of a switch 106. Switch 106 may be a low inductance switch such as a QuickSwitch, available from Texas Instruments, Inc. of Dallas, Tex. A second input of the switch 106 is grounded. A control input 107 connects an output 109 of the switch 106 to the first input or to the second input of the switch 106. The control input is connected to a DIFFSENS signal 108 of the SCSI bus 110.

DIFFSENS is a signal which indicates that a single-ended SCSI device is attached to the bus 110. When DIFFSENS is active, the switch 106 shorts the negative line of the differential pair to ground. This action provides a low inductive return path for single ended SCSI devices plugged into the differential SCSI bus by tying the negative line to ground as close to the connector as possible. When DIFFSENS is asserted, the switch 106 grounds the output 109 of the connector 110. Inductive coupling is minimized since a least inductive return current path is provided which is shared by the fewest number of signal lines in the bus.

Although FIG. 1. shows only one interconnection between the differential device 100 and the single-ended device 112, multiple devices may be connected in parallel over the bus 110 such as a SCSI bus.

Figure 2:
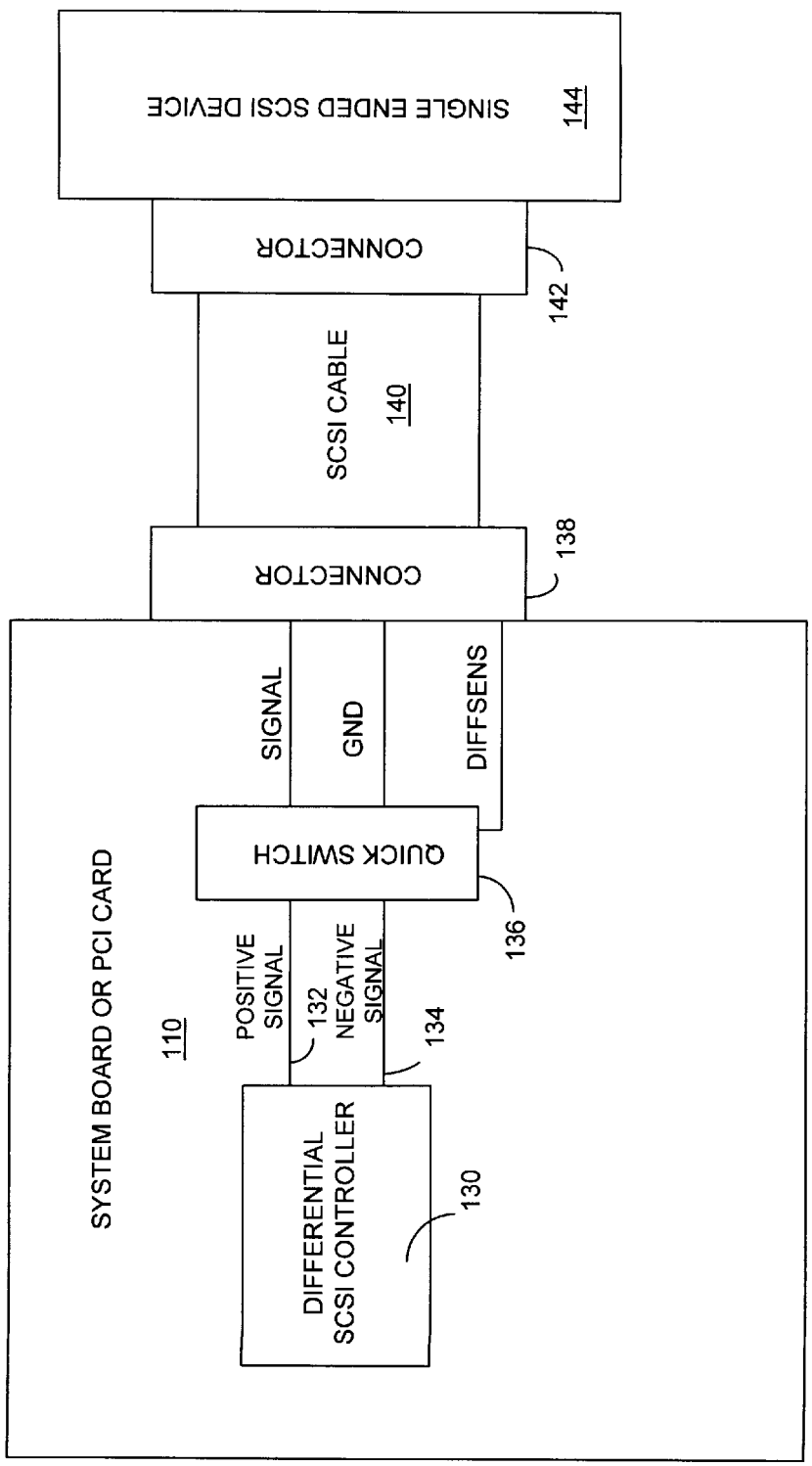
FIG. 2 is a block diagram of a system with a differential device driving a single-ended device.

FIG. 2 shows a differential SCSI controller 130 being connected to a single-ended device 144. The SCSI controller 130 may be mounted on a computer system motherboard. Alternatively, the SCSI controller 130 may be provided as an add-on card or adapter card mounted on an expansion bus such as a Peripheral Component Interconnect (PCI) bus, an Industry Standard Architecture (ISA) bus, or an Extended Industry Standard Architecture (EISA) bus. The differential SCSI controller 130 contains a plurality of the differential devices 100 (FIG. 1). A positive line 132 and a negative line 134 of one differential device in the differential SCSI controller 130 are provided to a switch 136. The differential SCSI controller 130 in turn controls one or more single-ended devices 144 through a connector 138, a cable 140 and a connector 142. In this manner, differential outputs from the differential SCSI controller 130 may be transmitted to various types of devices, including hard drives, tape drives, CD-ROMs, among others.

The cable 140 may be either an unshielded cable or a shielded cable. The unshielded cable may be used for in-cabinet applications. The shielded cable may be used for external applications where electromagnetic compatibility and electrostatic discharge protection may be required. Generally, the cable 140 should have a characteristic impedance in the range between 90 and 140 ohms. Moreover, the cable 140 should be a twisted-pair cable to minimize crosstalk between adjacent signals and may cause spurious pulses with differential signals.

Figure 3:
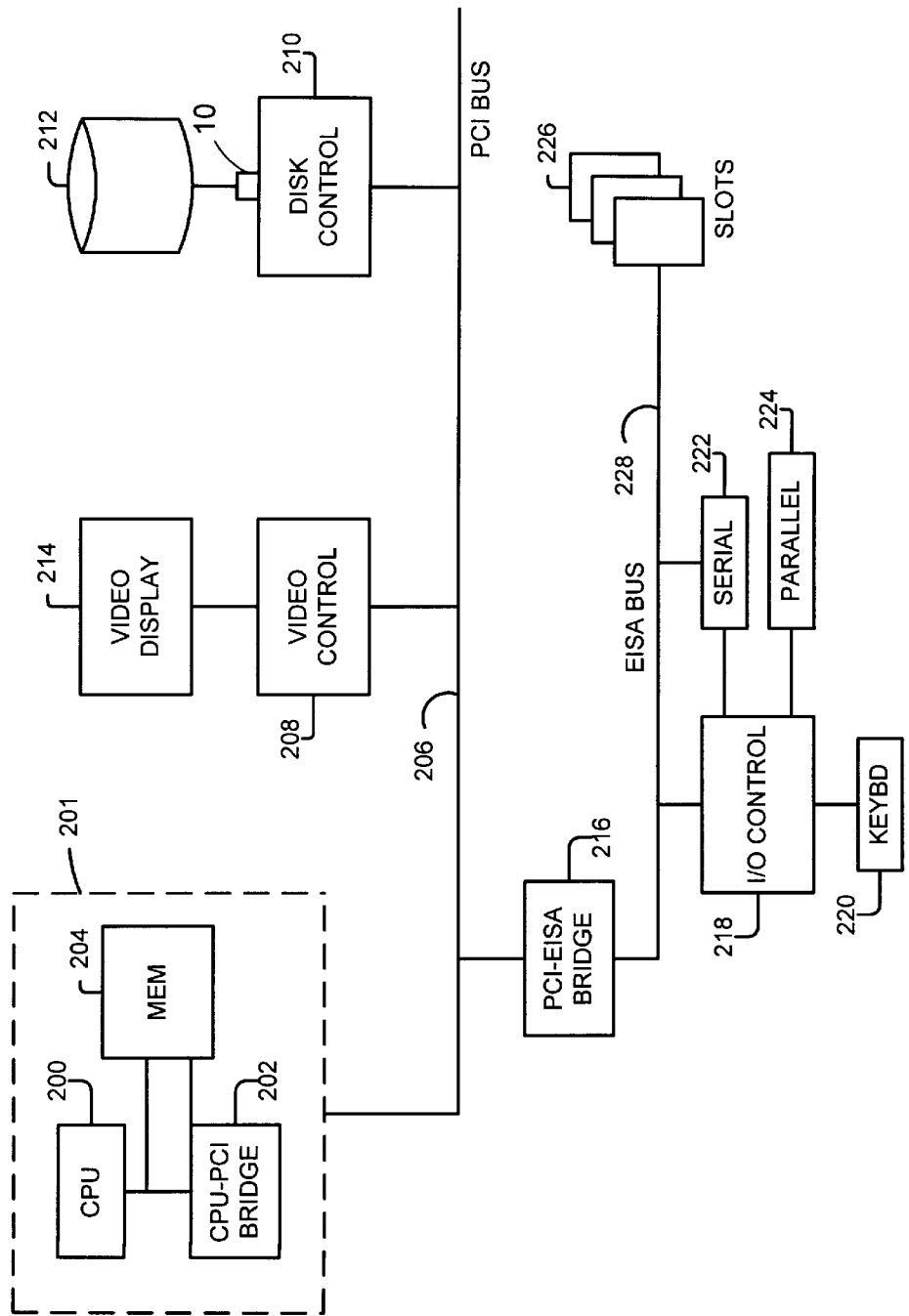
FIG. 3 is a block diagram of a computer system.

Referring to FIG. 3, a computer system 199 is illustrated. The system 199 includes a central processing unit (CPU) 200 connected by a CPU-PCI bridge 202 to a Peripheral Component Interconnect (PCI) bus 206. A main memory 204 is connected to the CPU 200 and CPU-PCI bridge 202. A mass storage device 212, in the form of hard disk drives, for example, is connected to a SCSI controller 210 which in turn connected to the PCI bus 206. A network controller card a network interface is also connected to the PCI bus 206. A video controller 208 controls signals transmitted between the PCI bus 206 and a video display 214.

An expansion bus 228, such as the Extended Industry Standard Architecture (EISA) or the Industry Standard Architecture (ISA) bus, is connected to the PCI bus 206 through a PCI-expansion bus bridge 216. The expansion bus 220 is connected to an input/output (I/O) controller 218, which provides interface ports to a keyboard 220, a pointer device 222 (such as a mouse), and a parallel port 224. The I/O controller 218 also controls access to a non-volatile random access memory (NVRAM), which can be implemented with a flash memory or an EEPROM. The NVRAM is used to store the system BIOS for performing the power up sequence in the computer system 199. Expansion slots 226 are connected to the expansion bus 228 to provide further expansion capabilities.

Although a solid state switch has been used to ground a negative line of a differential driver if the differential driver is driving a single-ended driver, other devices such as a relay or a manual switch may be used. Also, the control signal may be generated by circuits in the computer. Other buses may be used in place of the SCSI bus.

Other embodiments are also within the scope of the following claims.

What is claimed is:

1. A computer system, comprising:

a processor;

a display device coupled to said processor;

a memory array coupled to said processor;

a peripheral unit having at least one single-ended device for receiving data and commands;

a controller coupled to said processor, said controller having a differential device for driving said at least one single-ended device in said peripheral unit, said differential device having a negative line; and a bus adapter coupling said peripheral unit to said controller, said adapter including:
  a switch connected in said negative line between said differential device and a negative power supply bus line connected to said bus adapter; and
said switch is coupled to receive a sensing signal from the bus adapter which operates, to ground said negative power supply bus line at said bus adapter if said at least one single-ended device is connected to the bus.

2. The computer system of claim 1, wherein said sensing signal is a DIFFSENS signal on a Small Computer System Interface (SCSI) bus.

3. Apparatus for connecting power to a peripheral device over a bus including power supply lines, comprising:

a differential driver having power output lines coupled to said bus power supply lines by a bus connector;

said bus also including a signal line for a bus configuration signal indicating whether the bus is operating in a single-ended or a differential configuration, a switch device located close to said bus connector, between said connector and the differential device and connected in one of the power output lines from the differential driver device to a corresponding one of the power supply lines of said bus; and wherein said bus configuration signal line is connected to said switch device to operate the switch device to connect said corresponding one of the bus power supply lines to ground at said connector when said bus configuration signal indicates that the bus is operating in a single-ended configuration.

4. The apparatus of claim 3, wherein said differential device has a positive power output line connected to an input of said single-ended device.

5. The apparatus of claim 3, wherein said bus comprises a Small Computer System Interface (SCSI) bus.

6. The apparatus of claim 5, wherein said bus configuration signal comprises a DIFFSENS line on the SCSI bus.

7. The apparatus of claim 3, further comprising a controller for controlling said differential device.

8. The apparatus of claim 7, wherein the bus comprises a Small Computer System Interface (SCSI) bus and the controller is a SCSI controller.

9. Apparatus for connecting power to a peripheral device over a bus including power supply lines, comprising:

a differential driver having power output lines coupled to said bus power supply lines by a connector;

said bus also including a signal line for a bus configuration signal indicating whether the bus is operating in a single-ended or a differential configuration, a switch device located close to said connector, between said connector and the differential driver and connected in one of the power output lines from the differential driver to a corresponding one of the power supply lines to said peripheral device, and wherein bus configuration signal line is connected to said switch device to operate the switch device to connect said corresponding one of the power supply lines to said peripheral device to ground at said connector when said configuration signal indicates that the peripheral device is operating in a single-ended configuration.

10. The apparatus of claim 9, wherein the power supply lines are provided by a cable coupled between said connector and said peripheral device.

11. The apparatus of claim 10, wherein said cable comprises a SCSI cable, said SCSI cable including a DIFFSENS signal line to provide said configuration signal.

* * * * *